United States Patent [19]

Leff

[11] 4,309,658
[45] Jan. 5, 1982

[54] PORTABLE, BURIED OBJECT DETECTION SYSTEM WITH IMPROVED SIGNAL PROCESSING AND PRESENTATION

[76] Inventor: Abram Leff, 6814 Crossman St., Annandale, Va. 22003

[21] Appl. No.: 75,442

[22] Filed: Sep. 14, 1979

[51] Int. Cl.³ .............................................. G01V 3/165
[52] U.S. Cl. .................................................... 324/327
[58] Field of Search ................ 324/329, 326, 327, 328

[56] References Cited

U.S. PATENT DOCUMENTS 3,823,365  7/1974  Anderson .
4,213,093  7/1980  Pecori ................................. 324/329

*Primary Examiner*—Gerard R. Strecker

*Attorney, Agent, or Firm*—Nathan Edelberg; Robert P. Gibson

[57] ABSTRACT

An improved portable detection system incorporates a clock generator to produce a periodic signal that enables the user to properly pace his sweep and more readily identify targets in a first searching mode of operation. In the first mode, the detected signal is compared with an updated background developed from the previous sweeps, thus reducing the possibility of false alarms or missed targets. In a second pinpointing mode, background updating is discontinued and the developed background is used for target pinpointing. In this mode, a modified audio presentation is used which reduces hearing hazards associated with conventional variable tone presentations and enables easier target location.

1 Claim, 3 Drawing Figures

PORTABLE, BURIED OBJECT DETECTION SYSTEM WITH IMPROVED SIGNAL PROCESSING AND PRESENTATION

GOVERNMENT USE

The invention described herein may be manufactured, used, and licensed by or for the Government for Governmental purposes without the payment to me of any royalties thereon.

BACKGROUND OF THE INVENTION

This invention relates to portable apparatus used for geophysical exploration for buried objects such as mines, relics and minerals, which will be referred to by the generic terms targets and objects.

The prior art detectors utilize either a variable frequency tone or a single frequency variable volume tone as an acoustical presentation of the absence or presence, and proximity of a buried object. Both of these acoustical presentation systems are subject to several problems. The single frequency systems commonly use a tone such as 1000 Hz; this tone may be hazardous to hearing if operated for more than one-half hour per day. Furthermore, use of a single frequency tone presents a perceptual loudness adaptation problem. When the operator has listened to the tone for a few minutes, the tone is perceived by him as being fainter even though the level has remained constant, resulting in confusion as to whether the tone has changed or not.

The use of a variable frequency tone, likewise, has its disadvantages. While the fact that the sound level does not increase when approaching a target reduces the hearing hazard, the constant drone is still irritating. In addition, many people cannot discern if a tone is increasing or decreasing in frequency.

The prior art detector systems also present the user with a problem in terms of operation. The handheld search head utilized to detect the mines or other buried objects must be swept back and forth in an arc at a specific constant rate, usually 3 ft/sec, due to processing requirements; however, there has existed up until now no effective way for the operator to pace his sweep or hold it relatively constant for any significant period of time.

A further disadvantage of prior art systems was that the manner in which signals were processed made operation in certain soil conditions difficult or impossible with false alarms and missed or lost targets a frequent occurrence. A detector with preset threshold parameters will generate false alarms when noise levels are high, as is common with wet soil conditions, since the noise signal will often exceed the reference point by more than the amount required to trigger the detection signal; in contrast, with dry soil only a small deviation from the reference point may be indicative of a target, such that threshold parameters preset to levels in a range necessary to prevent false alarms will miss small objects which might not present a signal deviation high enough to be detected. On the other hand, a detector that uses the preceding sweep level as the background reference point with a preset deviation value for detection of targets cannot pinpoint a target since it will lose the signal after detection due to the reference signal being automatically updated toward the target's level, thereby bringing it within a non-triggering deviation level. A system that uses the latter method for detection and the former system for pinpointing can lose the target if the preset threshold level is above the level developed from the use of the actual background readings.

SUMMARY OF THE INVENTION

The present invention provides a portable detection device with an improved signal processing and presentation system. In a first or search mode of operation, the device emits clicks at a rate that coincides with the time required for one sweep of the detector head to enable the operator to pace his sweep, and the signals received by the head are used to develop a background level reference point. This reference point is a calculation based on the mean and standard deviations of the signals received during a specified number of the previous sweeps. An object that generates a signal that exceeds the mean by a prescribed amount in excess of the standard deviation generates a detection signal. The detection signal switches the device to a second, or pinpointing, mode of operation during which the previously developed background reference point is fixed and background level updating is discontinued. In this mode, the constant rate pacing click is replaced with a Geiger-type variable rate clicking audio presentation to thus enable precise target location.

DESCRIPTION OF THE PREFERRED EMBODIMENT

Figure 1:
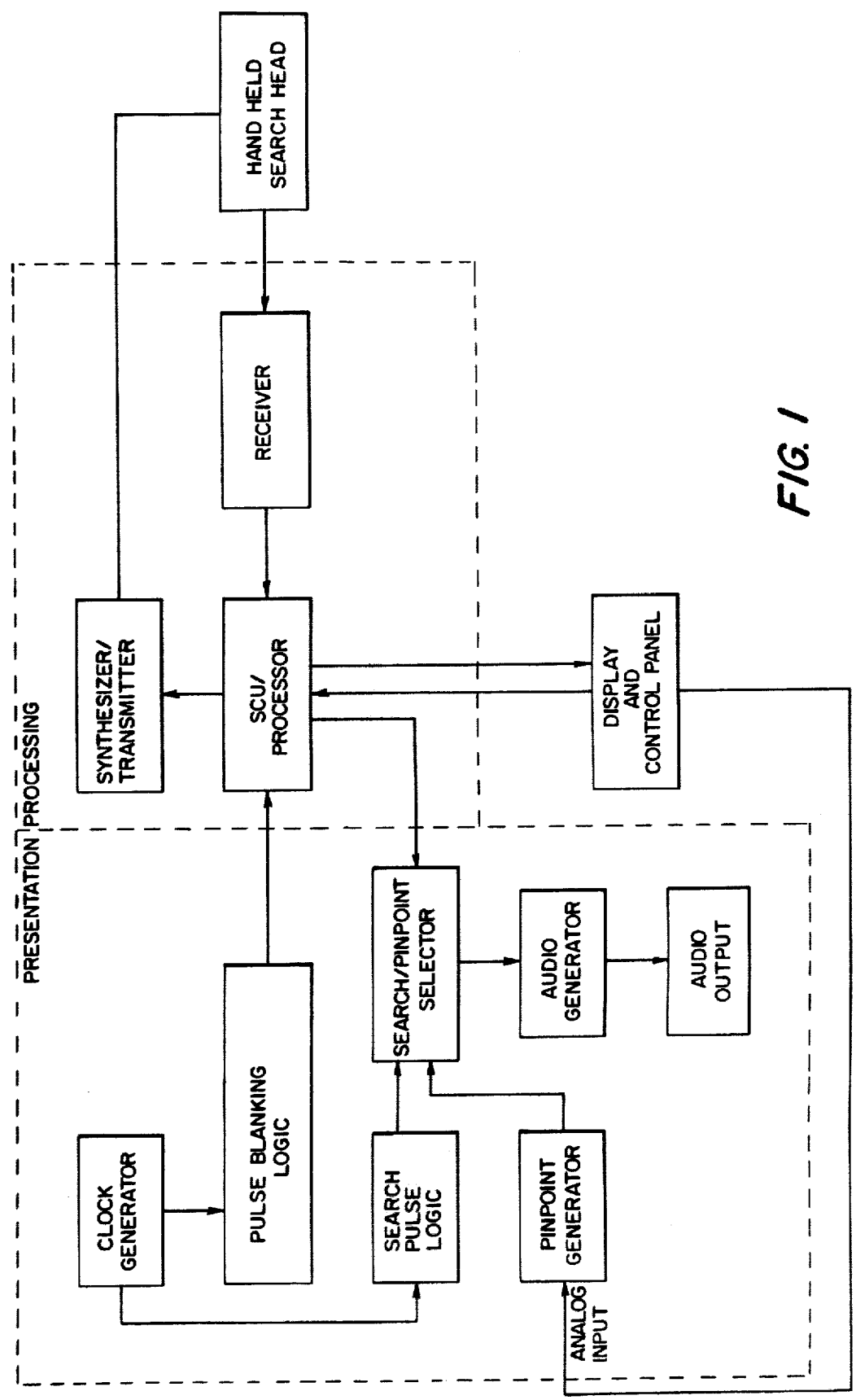
FIG. 1 is a block diagram of the detector system.

With reference to FIG. 1, the detector is composed of three basic components, i.e., the Presentation electronics, shown in the left side dotted position of the diagram in FIG. 1, the Processing electronics, shown in the center dotted portion of the diagram, and the Handheld Search Head, identified as such in the far right block. The concept and circuitry for electronic detection of buried objects is well known and any suitable electronics may be utilized for carrying out the teachings of this invention since the elements per se are known and only their organization so as to enable them to perform the described functions is new.

The specific nature of the device is best explainable with reference to its operation. Considering first the Presentation side of FIG. 1, it can be seen that a Clock Generator will produce a periodic signal at a regular rate. This rate is adjustable but, in most cases, a frequency of one signal every two or three seconds is preferable. The signal from the Clock Generator, which contains a crystal oscillator, is fed to the Search Pulse Logic which perform appropriate pulse shaping of the signal which is then received by the Search/Pinpoint Selector. The Search/Pinpoint Selector is a switching circuit which controls which signal will be presented audially to the operator. In the first or search mode, which is used prior to target detection, the signal from the Clock Generator is permitted to travel to the Audio Generator and produces an audio output in the form of a metronome type clicking. This steady clicking enables the user to pace his sweep of the Search Head at a rate required for the processing components to accurately perform their target detection function.

During the search mode, the SCU (System Control Unit)/Processor emits a control voltage to the Synthesizer/Transmitter which produces an RF signal that travels to the Hand-Held Search Head, which is basically an antenna. The output of this antenna feeds the Receiver, which is of the conventional detector type. The receiver detects and digitizes the input from the Search Head, which is a function of the degree of relative balance or unbalance detected by the antenna, and then feeds this output to the SCU/Processor for processing. Processing is achieved by a mini-computer, such as a CDC Model 469 mini-computer, which is programed to perform a processing algorithm that essentially develops a background value in terms of the mean and standard deviation for a specified number of sweeps of the Search Head. The input to the control panel from the processor is a signal level which is related to the magnitude of the processing data algorithm. The background value is continuously updated during each sweep by the processor and the signal received from the Receiver is compared against this background value. A received signal outside the threshold level of variance from the mean will indicate the presence of a buried object and will trigger the second or pinpoint mode.

When the second mode is triggered, a signal from the SCU/Processor sets off an indicator signal on the control panel to indicate the shift in mode and transmits an anolog input to the Pinpoint Generator as well as a shift command to the Search/Pinpoint Selector which stops the metronome signal and feeds the signal from the Pinpoint Generator to the Audio Output. The analog input is developed by a comparison between the stored background value and the received signal, and is converted by the Pinpoint Generator into a signal that produces a Geiger-type variable rate clicking audio output. The click rate may vary from the 2 per second search mode rate to as high as 40-50 clicks per second when the target is pinpointed in the second mode. After a target is pinpointed, the search mode can be reinstituted by means of a reset switch (not shown).

The use of a click presentation in the present invention has several advantages over the conventional presentation methods in that, (1) it requires no special training since it is almost universally known from familiarity with Geiger Counters that an increase in click rate indicates a reduction in distance to the target, (2) there are no adaptation or tonal distinction problems, and (3) clicks are less hazardous to hearing at a given sensation level than a pure tone.

Figure 2A:
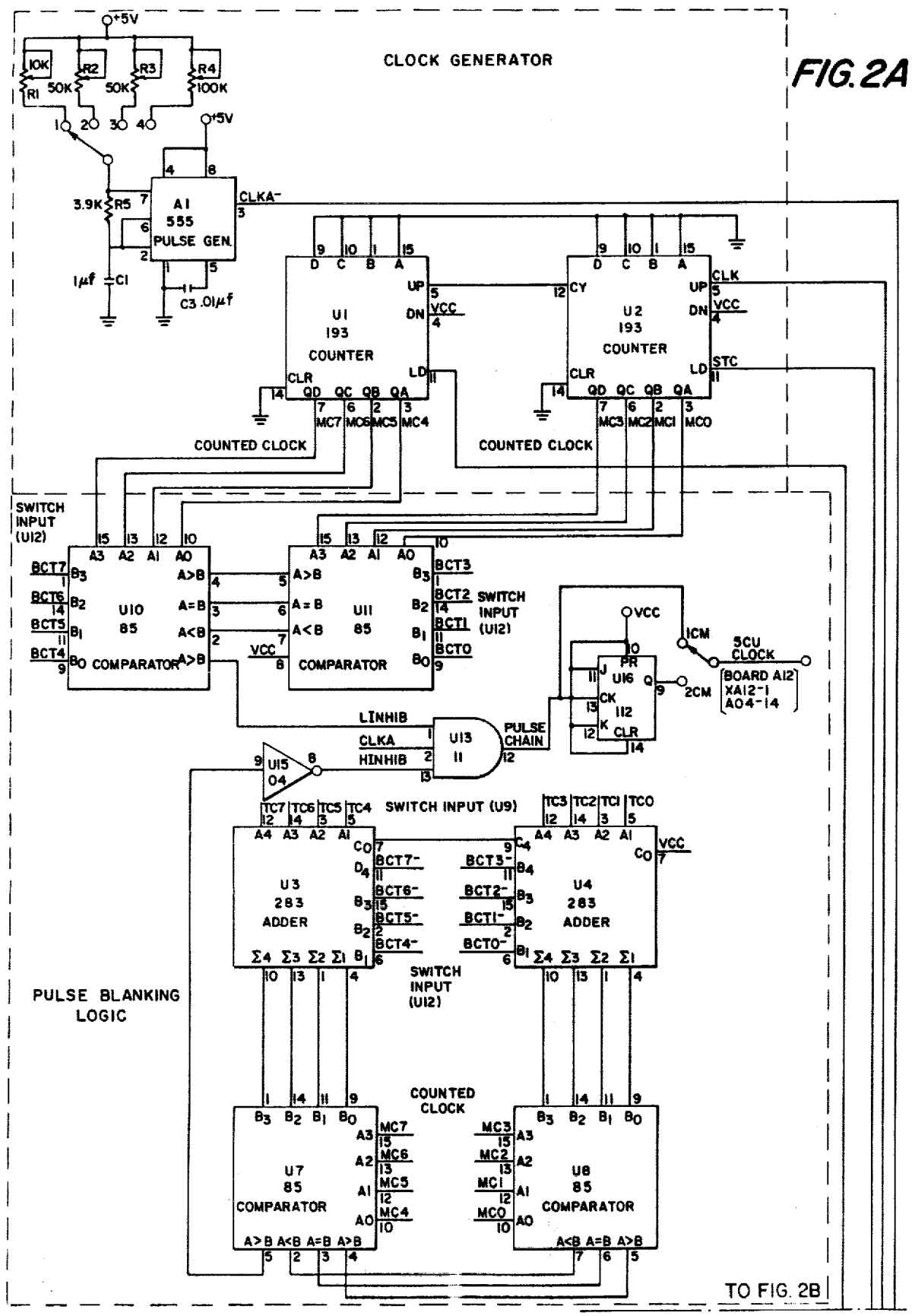
FIGS. 2A and 2B are a detailed showing of the block diagram of FIG. 1.
Figure 2B:
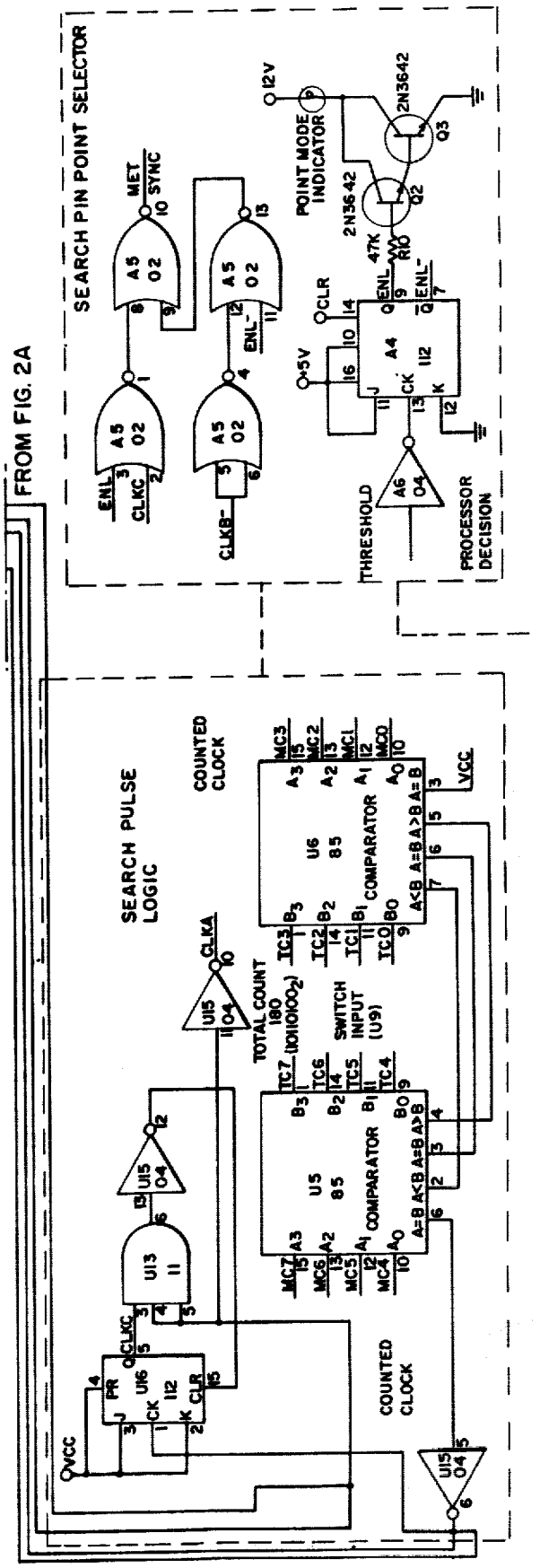
Figure 2B:
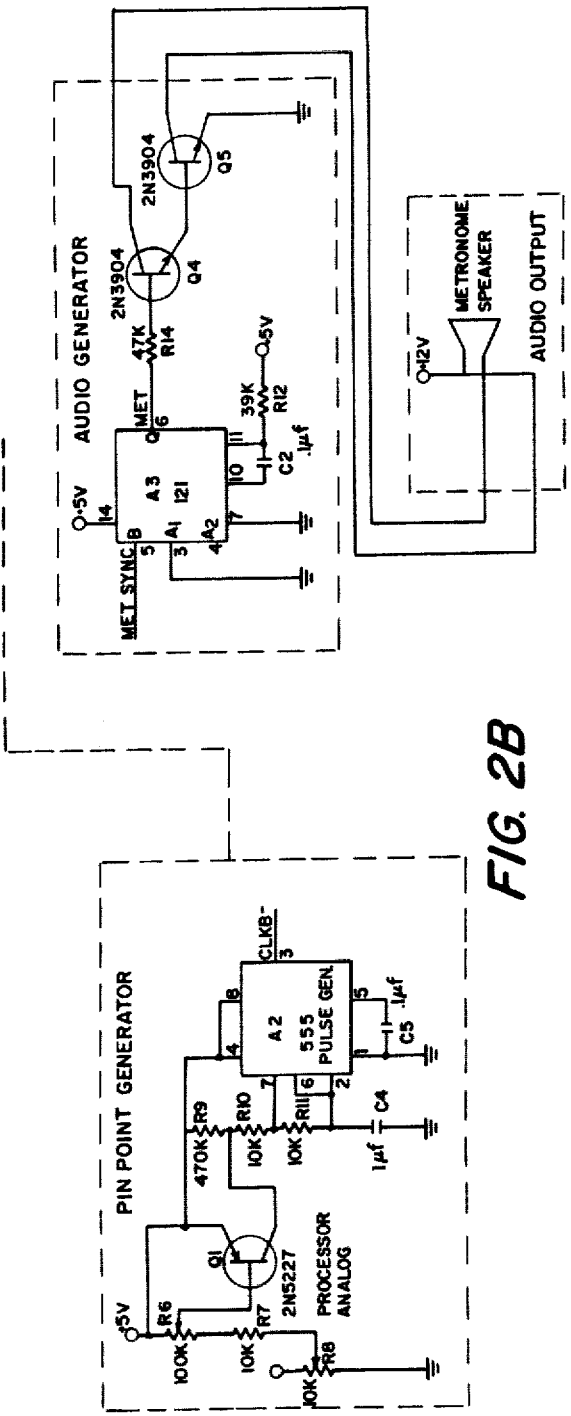

With reference now to FIG. 2, a more detailed description is given. A periodic signal CLKA is produced by the pinpoint generator A1, which is of the type manufactured by Signetics Corporation. This periodic signal is presented to two cascaded 4-Bit Up/Down counters. U1 and U2 manufactured by Texas Instruments. The periodic signal is presented to the count up port, pin 5 of U2, and after an external loading signal is received at pin 11, the signal is counted. The counted clock output is presented at pins 2, 3, 6 and 7, of U1 and U2 for use by the Pulse Blanking Logic and the Search Pulse Logic.

The Search Pulse Logic receives the counted clock output from U1 and U2 at pins 10, 12, 13 and 15 of U5 and U6, 4-Bit comparators, made by Texas Instruments. An externally mounted 8-Bit preset microswitch, U9, is connected to pins 1, 9, 11 and 14 of said comparators. A binary number is then selected by means of the manually controlled switch. This presents voltage levels to said comparator. When the voltage levels from the counted clock output equal the preset levels, an equality (A=B) output will be present at pin 6 of U5. By this means a predetermined number of clock pulses can be used to determine the metronome interval. This metronome interval signal is generated as clock C from U16, a J-K flip flop, made by Texas Instruments, controlled by the equality condition signal from U5. Clock A, the high speed clock, is implemented as the control clock for the SCU/Processing section upon qualification from the Pulse Blanking Logic. The net result of the Search Pulse Logic is to appropriately shape the clock Generator signal by slowing the high speed clock rate necessary for digital integrated circuit operation down to a useable speed for human audial interpretation.

The counted clock output from U1 and U2 is additionally presented to the Pulse Blanking Logic at pins 10, 12, 13 and 15 of U7, U8, U10 and U11 which are also 4-Bit comparators. At U10 and U11 and additional external present 8-Bit microswitch, U12, is connected to pins 1, 9, 11 and 14. A smaller value than the number used in U9 is then selected at U12. When the clock count exceeds this small number, a signal is issued at pin 5 of U10. This signal is presented to an AND gate U13, along with the high speed clock, CLOCK A.

Additionally, the inverted switch inputs from U12 are presented to pins 2, 6, 11 and 15 of U3 and U4, two 4-Bit adders, made by Texas Instruments. The switch inputs are inverted at U14. The result presented at the sum ports of the U3 and U4, i.e., pins 1, 4, 10 and 13, is the difference between the total switch count of U9 and the partial switch count of U12. This result from U3 and U4 is presented at U7 and U8, which are 4-Bit comparators. This input is presented at pins 1, 9, 11 and 14 of U7 and U8. The counted clock output is presented to the other input ports of the comparators, 10, 12, 13 and 15. As before, the signals are compared, and when counted clock output exceeds the switch count from U3 and U4 an inhibit pulse is issued from pin 5 of U7 and is presented to said AND gate, U13. The operation of this Pulse Blanking Logic is as follows. In the absence of an inhibit pulse from U7 or U10, clock A, the high speed digital clock, will be passed through the AND gate U13 and presented as the system clock for the SCU/Processing sections. If the number of clock pulses does not exceed a certain minimum number as determined by U9, then an inhibit signal will be issued from U10 to the AND gate U13. This will blank the pulse output and prevent processing by the mini-computer or microprocessor in the SCU/Processor section. Likewise, if the number of clock pulses exceeds a certain present maximum number determined by U9 and U12, an inhibit pulse will be issued from U7 which will again blank the clock A signal and prevent processing. As the switch count from U9 represents the period of time necessary for the operator to swing the search head from one end point to another, and as the operator has synchronized his reaching these endpoints with an audible signal representing this period as provided by clock C, the search head antenna will be at the sweep endpoints at the beginning and end of the switch count controlled by U9. Therefore, U12 will control the amount of blanking done at the beginning of the sweep via U10 and at the end of sweep via U7. This particular blanking design, employing external present 8-Bit switches, was chosen for ease of parameter variation in the field testing stage of the device.

The output from the Search Pulse Logic, clock C, is presented as one input to the Search/Pinpoint Selector. The Search/Pinpoint Selector, A5, is a Quad NOR gate, made by Texas Instruments. The other input is obtained from the Pinpoint Generator. The Pinpoint Generator receives the analog representation of the processed data from the SCU/Processor section via the Display and Control Panel and digitizes it by a timer A2 operated as pulse position modulator. This changes an analog input signal into a Geiger counter like output, where pulse repetition rate is a function of the analog signal voltage level. This signal is represented as clock B. This signal is presented to the Search/Pinpoint Selector at pins 5 and 6 of A5. The Search/Pinpoint Selector also receives the processing decision signal from the SCU/Processor as to whether the processed data has exceeded the threshold level determined to be necessary to classify the signal as a target. The signal is presented to J-K flip flop A4 which produces the Enable signal if the threshold signal has been received and the Enable signal if the threshold signal has not been received. An externally controlled clear signal is presented at pin 14 of 4A to clear the device after a threshold signal has been received. The Enable signal is used to control a display light indicating an alarm condition and at the NOR gates A5. When the Enable signal is present indicating a target, clock B will be outputted as the audio output signal. This clock is proportional to the processed signal strength and is used to pinpoint or outline the target. If the Enable signal is not present, clock C will be outputted to the audio output section to control the operators pacing of his sweep.

The Audio Output Section involves conventional audio circuitry including a one shot multivibrator, made by Texas Instruments, to drive a speaker.

The balance of the system involves standard circuitry. The SCU/Processor may be a CDC 469 minicomputer or microprocessor device. The control functions include timing and frequency command of transmitter, control of the detected and digitized RF signal from the receiver to the Processor, timing for the Processor, and out-putting the processed data. Processing functions have been described in the specification.

The Search Pulse Logic output signal is employed as the control clock for the SCU/Processor. This signal is employed as the interrupt controller for the central processing unit and will determine when the CPU will actively process data. For example, if a microprocessor device, such as Texas Instruments model 9900 is employed, the control signal would be presented at the HOLD input. This input serves as an interrupt controller to the Central Processing Unit and controls the processing interval. During normal operation, data will be processed until the receipt of inhibit signals from either U7 or U10, indicating that the blanking interval is present.

It is also apparent the the processing technique utilized by the present invention will provide a detecting device that is not prone to the problem of false alarm, and lost or missed signals that were attendant to the prior art systems since no arbitrary or preset threshold values are utilized thus allowing the detector processing equipment to adjust for varying conditions, while the use of metronome sweep pacing affords greater accuracy by permitting the operator to move the Search Head at the rate prescribed by the processing requirements.

It will be appreciated by those skilled in the art that various forms of circuits and components can be utilized to obtain the described functions; and, while the preferred embodiment uses both metronome sweep pacing and the improved signal processing system, the sweep pacing could be used with other processing systems, and the improved processing system could be used without sweep pacing or in conjunction with other pacing systems. Accordingly, the invention should not be viewed as limited beyond the scope of the appended claims.

I claim:

1. An improved object detection device of the sweep search head/transceiver system variety with audio output means adapted to produce a clicking sound with the occurrence of each pulse output of the system, wherein connecting means are provided for connection of said system to said audio output means, wherein the frequency rate of the pulse output of the system increases as the search head approaches the object and wherein the improvement comprises:

clock generator means for producing a pulse output signal with a selected frequency rate in the audio frequency range for producing the clicking sound, and adapted to be coincident in time with the time required for one sweep of the search head so as to enable a user to pace his sweep;

said connecting means includes a two mode switching means, said switching means adapted to connect only the output of said clock generator means to said audio output means in a first mode of operation, the object search mode, and to connect only the output of said search head/transceiver system to said audio output means in a second mode of operation, the object pinpointing mode, wherein in said second mode a constant rate pacing clicking sound is replaced by a Geiger-type variable rate clicking sound to enable precise object location;

wherein said two mode switching means is adapted to switch from said first mode of operation to said second mode of operation when a significant change occurs in output signal intensity level from said system with respect a reference signal intensity level, wherein said significant change is caused by the detection of an object and;

wherein said two mode switching means is adapted to switch when said significant change is a selected signal intensity level from said system developed from a selected number of the currentmost sweeps of the search head.

* * * * *